(12) United States Patent
Mitsui (10) Patent No.: US 8,764,100 B2
(45) Date of Patent: Jul. 1, 2014

(54) VEHICLE ROOF STRUCTURE

(71) Applicant: Suzuki Motor Corporation, Shizuoka-ken (JP)

(72) Inventor: Yougo Mitsui, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/892,474

(22) Filed: May 13, 2013

(65) Prior Publication Data

US 2014/0028054 A1    Jan. 30, 2014

(30) Foreign Application Priority Data

Jul. 30, 2012 (JP) ................................. 2012-167932

(51) Int. Cl.
*B60R 21/04* (2006.01)

(52) U.S. Cl.
CPC ..................................... *B60R 21/04* (2013.01)
USPC ..................................... 296/187.13; 296/214

(58) Field of Classification Search
CPC ..... B60R 13/0212; B60R 21/04; B62D 25/06
USPC ........................ 296/187.13, 193.12, 210, 214
See application file for complete search history.

(56) References Cited

U.S. PATENT DOCUMENTS

2009/0286439 A1*  11/2009  Wittenzellner et al. ....... 442/120

FOREIGN PATENT DOCUMENTS

JP               4504829  B2      7/2010

* cited by examiner

*Primary Examiner* — Lori Lyjak
(74) *Attorney, Agent, or Firm* — Myers Bigel Sibley & Sajovec, P.A.

(57) ABSTRACT

Provided is a vehicle roof structure capable of preventing turn of a roof side absorber about its axis in the vehicle front-rear direction. A roof side absorber 10 is arranged between a roof side panel 20 and a side portion 30S of a roof lining 30. An opening trim 40 is fitted to an end portion of the roof side panel 20 on the upper side of a door opening. An upper contact portion 27 provided at an upper end portion of the roof side absorber 10 is in contact with the roof side panel 20. A lower contact portion 19 provided at a lower end portion of the roof side absorber 10 is in contact with the opening trim 40.

6 Claims, 9 Drawing Sheets

VEHICLE ROOF STRUCTURE

RELATED APPLICATION

This application claims priority from Japanese Patent Application No. 2012-167932, filed Jul. 30, 2012, the disclosure of which is incorporated by reference herein in its entirety.

FIELD AND BACKGROUND OF THE INVENTION

The present invention relates to a vehicle roof structure including: a roof side absorber arranged between a roof side panel and a side portion of a roof lining; and an opening trim fitted to an end portion of the roof side panel on the upper side of a door opening.

The roof side absorber mentioned above has a function of deforming, when an occupant hits his or her head against the roof side due to a lateral collision, to absorb the impact and thereby reduce the damage on the occupant's head. Further, the roof side absorber also has a function of improving appearance by preventing a gap from being created between A, B, and C pillar trims and the roof lining at the boundary of the A, B, and C pillar trims and the roof lining.

The conventional vehicle roof structure described above is configured such that the roof side absorber is swingable in the width direction thereof about a point at which the roof side absorber is attached to the roof lining, so as to be able to change and adjust the attachment position of the roof side absorber (see Japanese Patent No. 4504829).

SUMMARY OF THE INVENTION

The above conventional structure entails increase in the width of the roof side absorber and thus requires a wide attachment space. Moreover, the conventional structure entails increase in the widthwise (vertical) dimension of the roof side absorber including its attachment portion and thus increases the likelihood of the roof side absorber turning about its axis in the vehicle front-rear direction (rotation about the axis).

An object of the present invention is to provide a vehicle roof structure capable of reducing an attachment space for a roof side absorber and preventing turn of the roof side absorber about its axis in the vehicle front-rear direction.

An aspect of the present invention is a vehicle roof structure including: a roof side absorber arranged between a roof side panel and a side portion of a roof lining; and an opening trim fitted to an end portion of the roof side panel on an upper side of a door opening, in which an upper contact portion provided at an upper end portion of the roof side absorber is in contact with the roof side panel, and a lower contact portion provided at a lower end portion of the roof side absorber is in contact with the opening trim.

The roof side absorber attempts to rotate about the axis of the roof side absorber in the vehicle front-rear direction due to its own weight or external force. However, with the configuration of the present invention described above, the rotation of the roof side absorber about the axis (referred to as "turn") can be prevented as described below.

Specifically, suppose that the roof side absorber on the right side of the vehicle body attempts to rotate about the axis clockwise or the roof side absorber on the left side of the vehicle body attempts to rotate about the axis counterclockwise as viewed from the rear of the vehicle. In this case, the upper contact portion comes into contact with the roof side panel and is thus received by the roof side panel. Accordingly, the rotation of the roof side absorber about the axis is prevented.

Suppose also that the roof side absorber on the right side of the vehicle body attempts to rotate about the axis counterclockwise or the roof side absorber on the left side of the vehicle body attempts to rotate about the axis clockwise as viewed from the rear of the vehicle. In this case, the lower contact portion comes into contact with the opening trim and is thus received by the opening trim. Accordingly, the rotation (turn) of the roof side absorber about the axis is prevented.

As a result, the roof side absorber can receive impact from the inside of the cabin from the intended direction. Thus, the roof side absorber can effectively absorb impact on an occupant's head.

For example, in the case of a structure of a comparative example in which the upper contact portion and the lower contact portion are both in contact with the roof side panel, the upper contact portion and the lower contact portion which are separated away from each other in the top-bottom direction are both arranged above the opening trim (the lower end of the roof side absorber of the present invention is located at the same position as the lower end of the roof side absorber of the comparative example). For this reason, required is a structure which includes the roof side absorber of the present invention with its upper end portion extended further upward. This increases the dimension of the roof side absorber in the top-bottom direction.

In contrast, the configuration of the present invention described above can reduce the dimension of the roof side absorber in the top-bottom direction and thus reduce the size of the roof side absorber. Moreover, the configuration of the present invention can reduce the attachment space for the roof side absorber in the top-bottom direction.

Accordingly, it is possible to improve the design freedom without affecting the design of the vehicle and the layout of other components held therein.

In the present invention, an attachment portion provided to the roof side absorber is attached to the roof side panel, and the lower contact portion is arranged below the attachment portion. Accordingly, the following effect can be exerted.

In the case of the configuration in which the lower contact portion is in contact with the opening trim, the gap between the roof side absorber and the roof side panel to which an attachment base portion of the opening trim is fitted is small. The roof lining and the roof side absorber are attached to a vehicle body panel such as the roof side panel, and thereafter the opening trim is attached by fitting onto the end portion of the roof side panel. Thus, when the above-mentioned gap is small, the following problem occurs.

Specifically, the roof side panel is formed by welding multiple parts, and this welding lowers the dimensional accuracy of the roof side panel. Moreover, the roof side absorber itself has large variations in the gap between itself and the roof side panel in areas apart from the attachment portion. For this reason, when the above-mentioned gap is short, positional variations of the roof side panel and positional variations of the roof side absorber may make it difficult to insert the attachment base portion of the opening trim between the roof side absorber and the roof side panel. This may lead to a possibility that the mountability of the opening trim could be lowered.

However, in the configuration of the present invention described above, the lower contact portion is arranged below the attachment portion where it is easy to secure positional accuracy. Thus, the above-mentioned gap can be easily set to the desired dimension. This can improve the mountability of the opening trim. Accordingly, the lower contact portion can be set in contact with the opening trim securely.

In the present invention, the lower contact portion is not provided to any portions of the roof side absorber other than the portion below the attachment portion. Accordingly, the following effect can be exerted.

The lower contact portion is arranged only below the attachment portion where it is easy to secure positional accuracy. Thus, influence of the low dimensional accuracy of the roof side panel is avoided, as well as influence of the positional variations of the roof side absorber. Accordingly, the above-mentioned gap can be set to the desired dimension more easily. This makes it possible to further improve the mountability of the opening trim.

In the present invention, the lower contact portion is formed of a contact piece projecting toward the roof side panel from a lower end portion of the roof side absorber, the contact piece is formed elongated in a longitudinal direction of the roof side absorber, and both longitudinal end portions of the contact piece are formed such that amounts of projection thereof from the lower end portion of the roof side absorber increase gradually toward a longitudinal center of the contact piece. Accordingly, the following effect can be exerted.

Both longitudinal end portions of the contact piece are formed such that the amounts of the projection thereof from the lower end portion of the roof side absorber increase gradually toward the longitudinal center of the contact piece. Thus, when one inserts the attachment base portion of the opening trim between the roof side absorber and the roof side panel, both end portions can guide the attachment base portion of the opening trim into the gap between the roof side absorber and the roof side panel.

As a result, the opening trim can be mounted smoothly to the roof side panel without being caught on the lower contact portion (contact piece). This can improve the mountability of the opening trim.

The present invention can provide a vehicle roof structure capable of reducing an attachment space for a roof side absorber and preventing turn of the roof side absorber about its axis in the vehicle front-rear direction.

DESCRIPTION OF THE EMBODIMENTS OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

Hereinbelow, a mode for carrying out the invention will be described based on the drawings.

Figure 4:
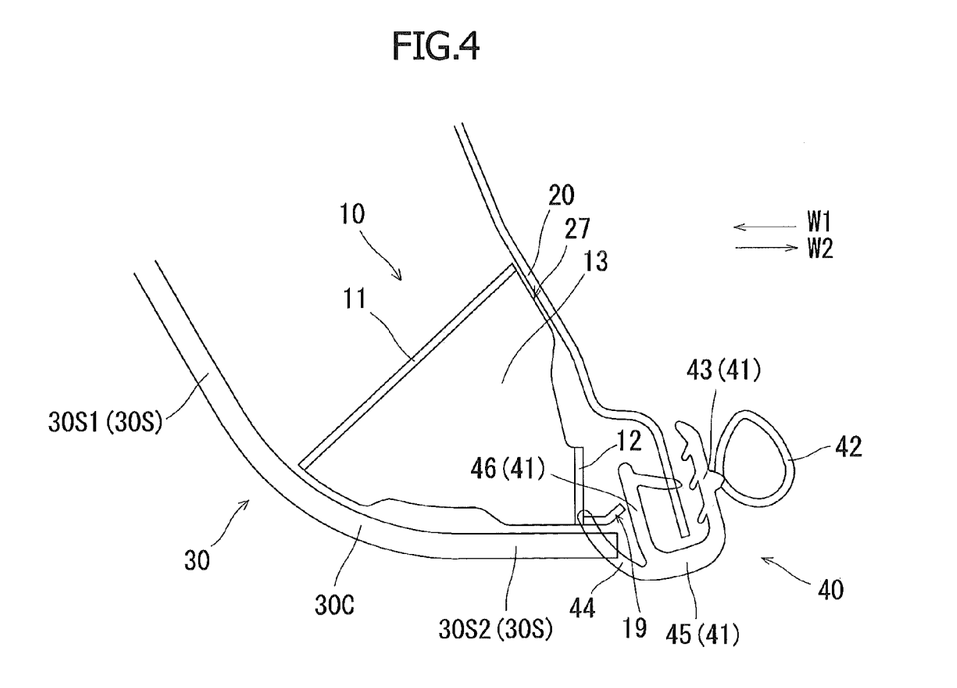
FIG. 4 is a cross-sectional view taken along line A-A in FIG. 2.

As shown in FIGS. 1, 2, 4, and 7, resin-made roof side absorbers 10 elongated in the vehicle front-rear direction and having grid patterns are arranged above a door opening H1 for a front door of an automobile and above a door opening H2 for a rear door of the automobile, respectively, between a roof side panel 20 and a side portion 30S of a roof lining 30 (see FIG. 4).

The roof lining 30 is an interior member covering a roof panel (not shown) from the inside of the cabin and is attached to the roof panel. The roof side panel 20 forms a side part of the vehicle body. While each of the drawings mentioned above shows the roof side absorbers 10 on the right side of the vehicle body, roof side absorbers 10 bilaterally symmetric to the roof side absorbers 10 are arranged on the left side of the vehicle body as well. When an occupant hits his or her head against the roof side due to a lateral collision, the corresponding roof side absorber 10 deforms to absorb the impact and thereby reduce the damage on the occupant's head.

As shown in FIG. 4, the roof side panel 20 above the door opening H1 for the front door is inclined (slightly) with respect to the top-bottom direction such that the roof side panel 20 is situated further on the inside W1 of the cabin as extending upward.

As shown in FIG. 4, the side portion 30S of the roof lining 30 extends to the vicinity of the roof side panel 20. The side portion 30S bends downward in an L shape in cross section, so that it is formed of a vertical wall portion 30S1 and a horizontal wall portion 30S2 extending from a lower end portion of the vertical wall portion 30S 1 toward the outside W2 of the cabin (outer side in the vehicle width direction). The vertical wall portion 30S1 is inclined such that the vertical wall portion 30S1 is situated closer to the outside W2 of the cabin as extending downward. Moreover, a corner portion 30c between the vertical wall portion 30S1 and the horizontal wall portion 30S2 is formed in a convex arc shape.

Figure 5:
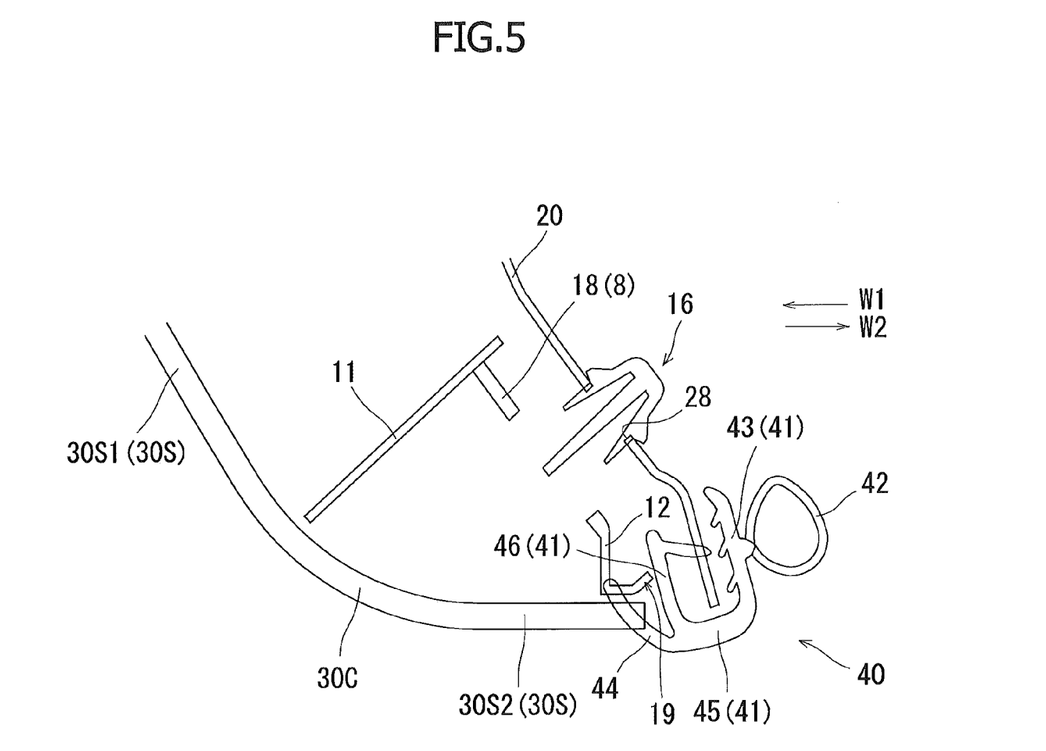
FIG. 5 is a cross-sectional view taken along line B-B in FIG. 2.
Figure 7:
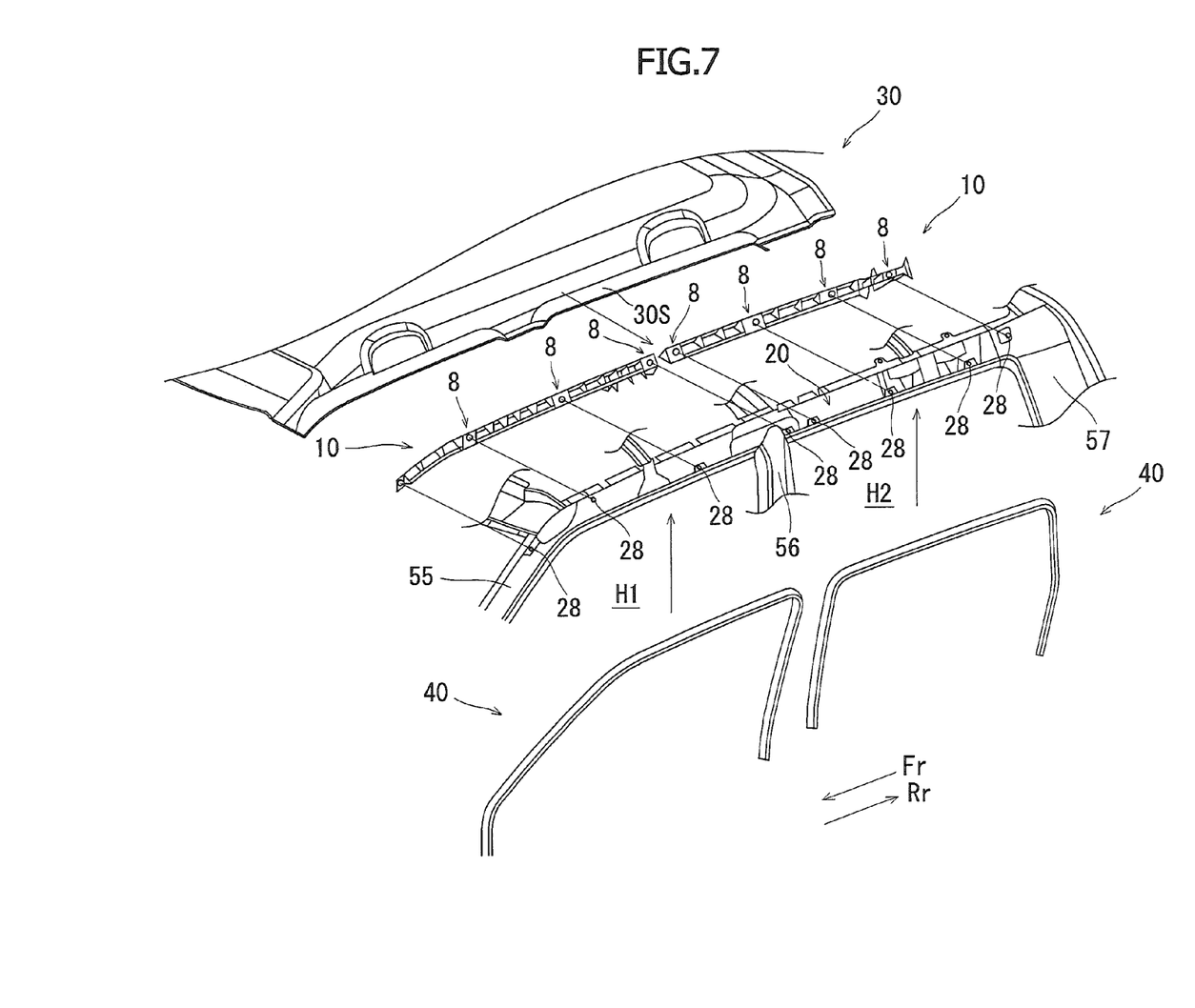
FIG. 7 is an exploded perspective view of the vehicle roof structure.

As shown in FIGS. 4, 5, and 7, opening trims 40 made of a body with rubber-like elasticity are attached by fitting to the periphery of the door opening H1 for the front door and the periphery of the door opening H2 for the rear door, respectively. Specifically, at the periphery of the door opening H1 for the front door, an attachment base portion 41 of the corresponding opening trim 40 having a U shape in cross section is fitted to an end portion of the roof side panel 20 on the upper side of the door opening H1, to an end portion of an A pillar panel 55 on the vehicle rear side Rr, and to an end portion of a B pillar panel 56 on the vehicle front side Fr.

Each of the opening trims 40 includes: the attachment base portion 41 mentioned above; a hollow seal portion 42 continuous with the outer surface of one sidewall 43 of the attachment base portion 41 (sidewall on the outside W2 of the cabin); and a seal lip 44 extending upward at an outer side of the other sidewall 46 (sidewall on the inside W1 of the cabin) from a side portion of a bottom wall 45 of the attachment base portion 41. In a state where the door is closed, the hollow seal portion 42 is pressed against the periphery of the door and thereby blocks outside noises from entering the cabin.

The roof side absorber 10 located above the door opening H1 for the front door and the roof side absorber 10 located above the door opening H2 for the rear door have substantially the same configuration. In the following, description will be provided for the roof side absorber 10 located above the door opening H1 for the front door.

Figure 1:
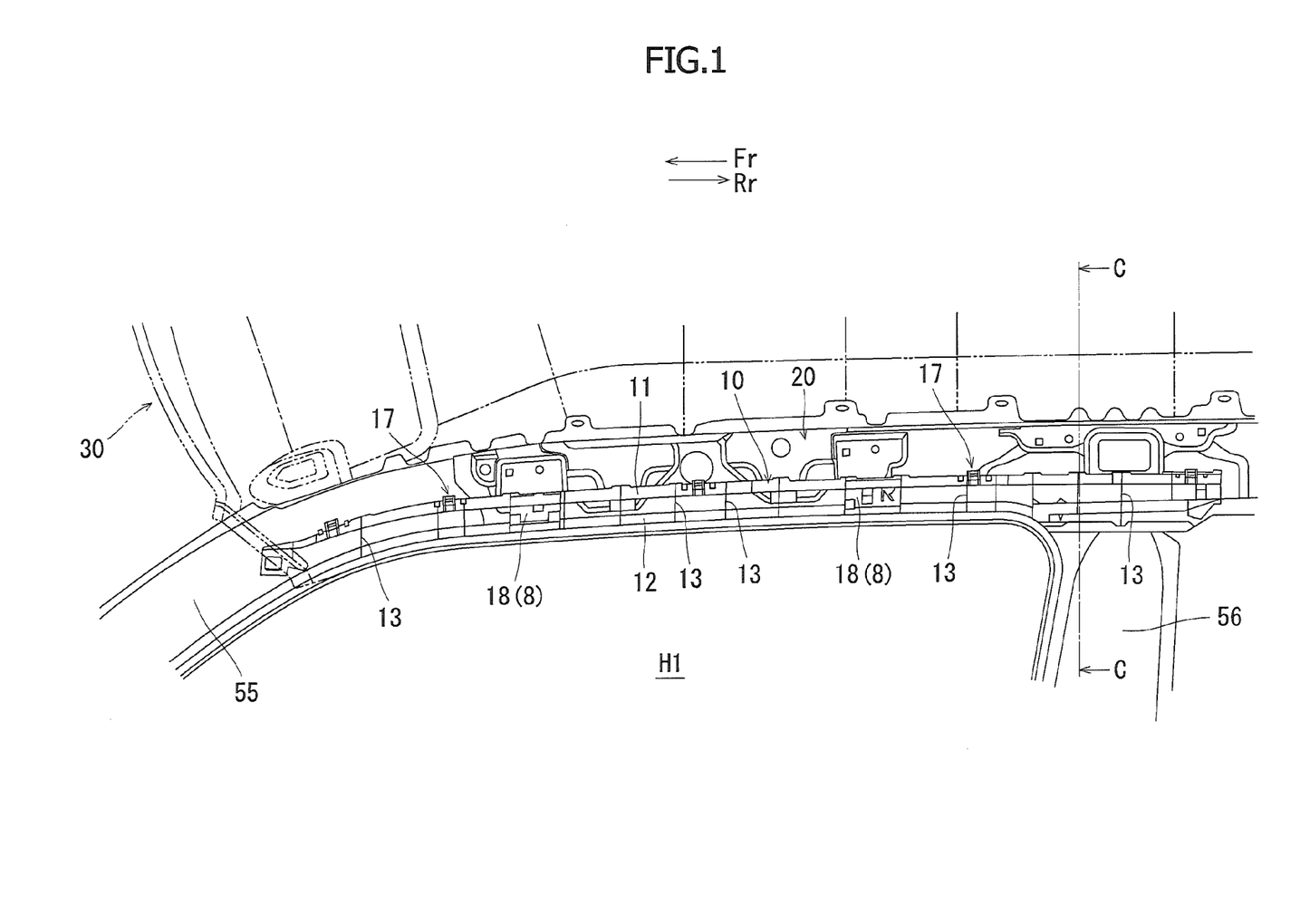
FIG. 1 is a perspective view of a vehicle roof structure as seen from the inside of the cabin.
Figure 2:
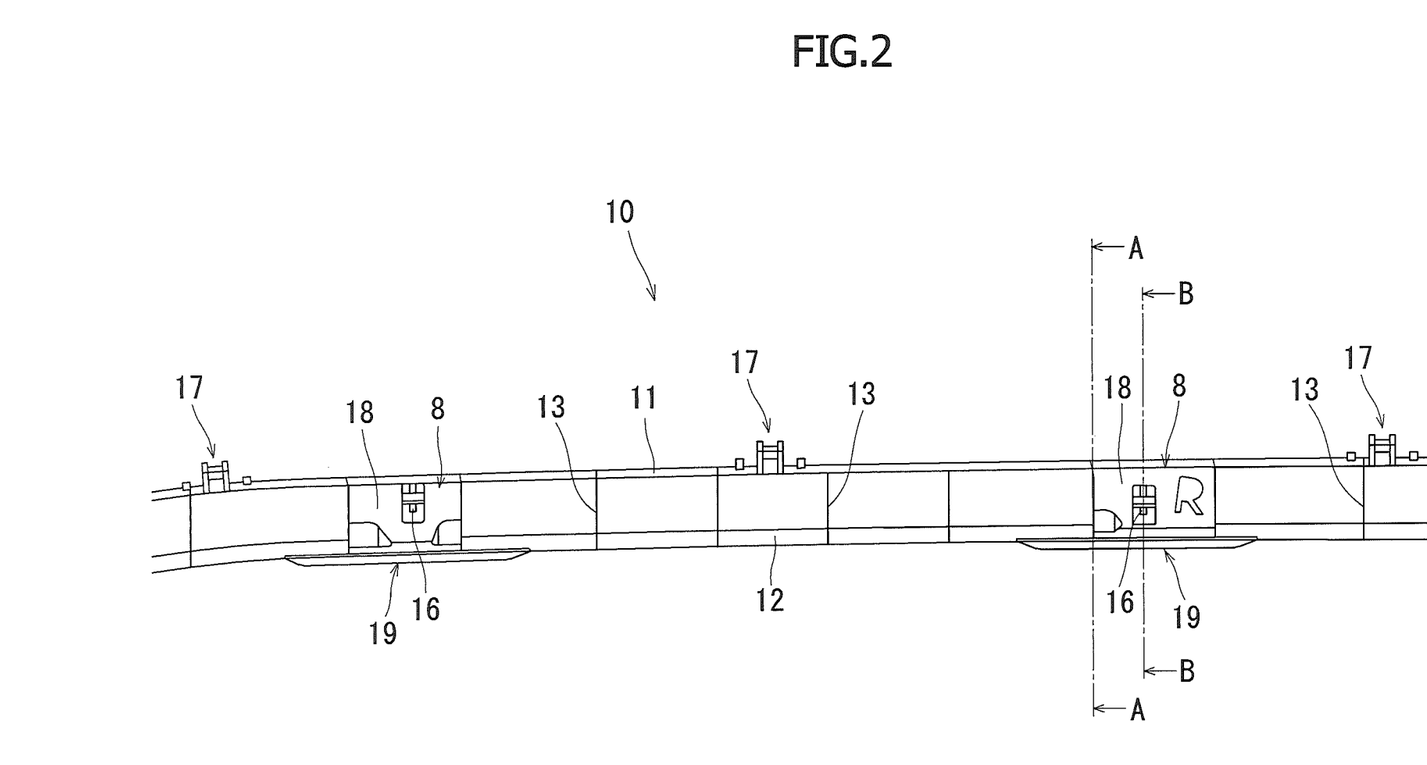
FIG. 2 is a view of a roof side absorber as seen from the inside of the cabin.
Figure 8:
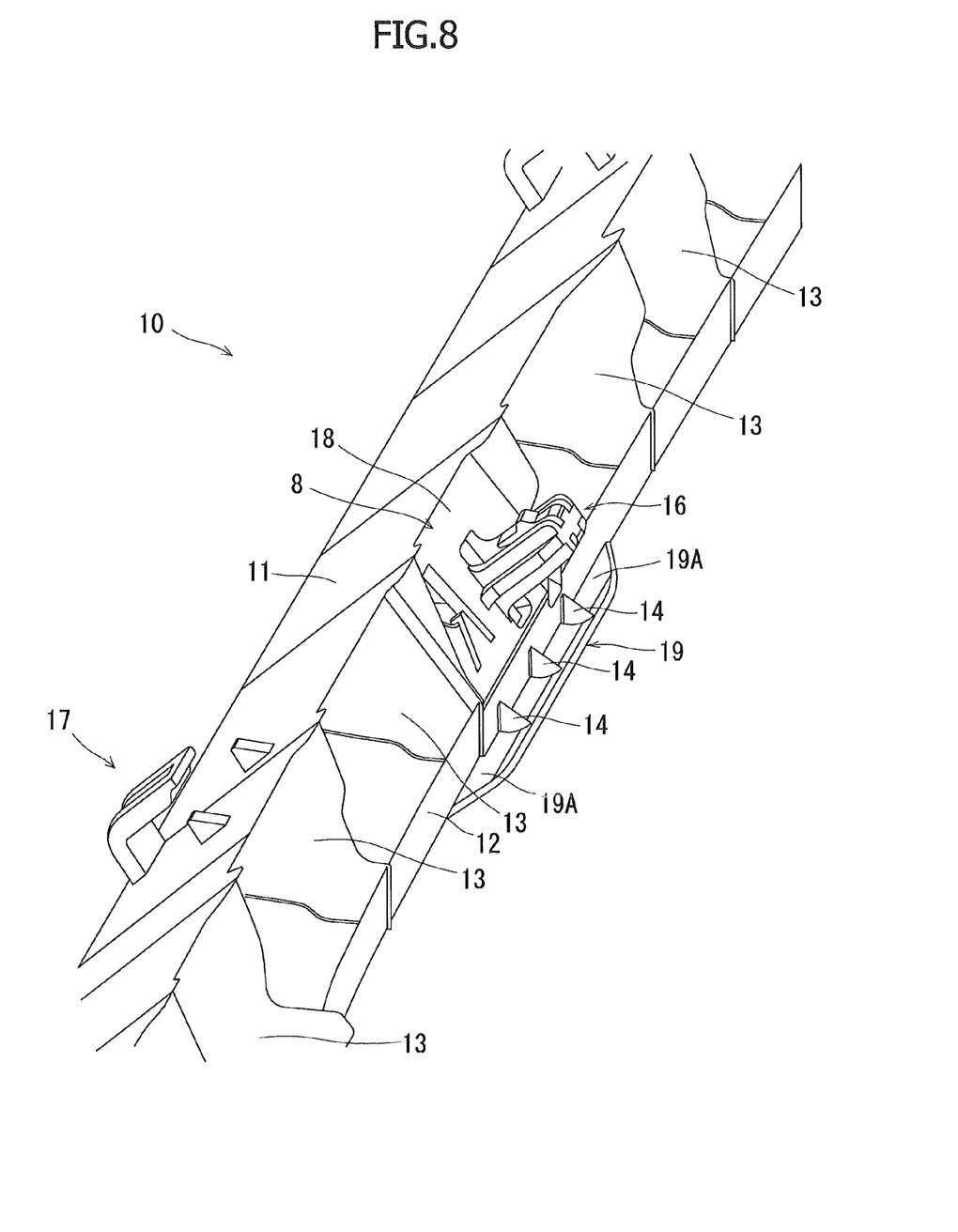
FIG. 8 is a perspective view of the roof side absorber.

As shown in FIGS. 1, 2, and 8, the above roof side absorber 10 includes: a first grid member 11 having a long plate shape longer in the vehicle front-rear direction; a second grid member 12 formed narrower than the first grid member 11 and having a long plate shape longer in the vehicle front-rear direction; and multiple triangular third grid members 13 laid between the first grid member 11 and the second grid member 12.

Figure 6A:
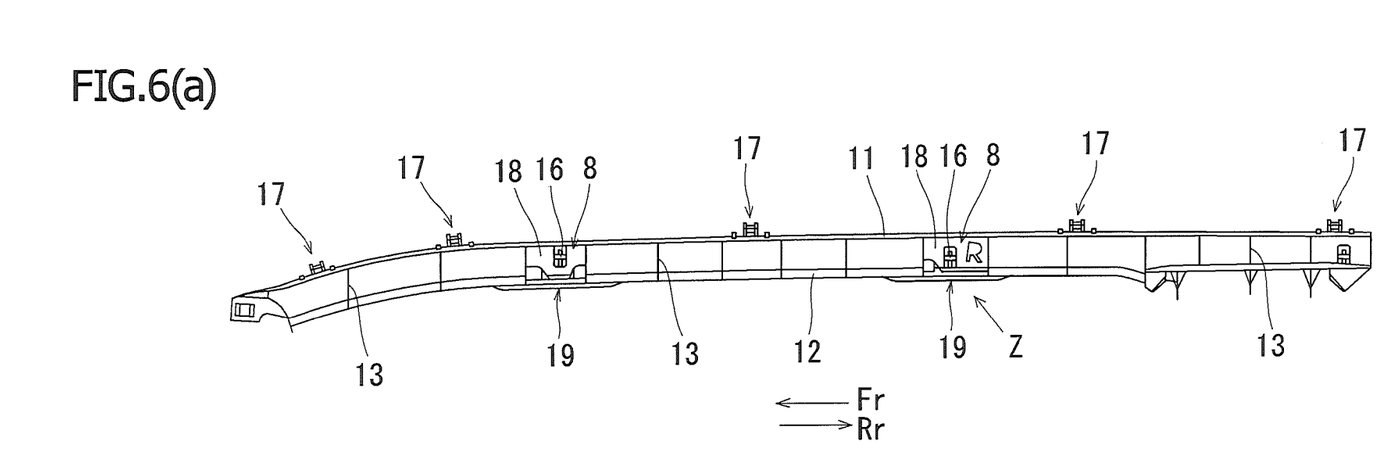
FIG. 6A is a view of the roof side absorber as seen from the inside of the cabin.

In addition, a pair of front and rear attachment plates 18 located with a gap therebetween in the vehicle front-rear direction is laid between the first grid member 11 and the second grid member 12. The attachment plates 18 are formed in a rectangular shape longer in the vehicle front-rear direction. Moreover, a clip 16 projecting toward the roof side panel 20 is formed on a center portion of each attachment plate 18. As shown in FIG. 5, the clip 16 is inserted in and engaged with a clip hole 28 (see also FIG. 7) formed in the roof side panel 20. The pairs of attachment plate 18 and clip 16 form attachment portions 8 to the roof side panel 20, respectively. As shown in FIG. 6A, the attachment portions 8 are aligned in a substantially straight line in the vehicle front-rear direction. Accordingly, the width of the roof side absorber 10 in the top-bottom direction can be set to be small.

Further, multiple engagement claws 17 located at given intervals in the vehicle front-rear direction are provided on the outer surface of the first grid member 11 (opposite surface from the second grid member 12). The engagement claws 17 are claws for fixing a washer hose and are provided to the right roof side absorber 10 only.

As shown in FIG. 4, in a vertical cross section seen in the vehicle front-rear direction, the first grid member 11 is inclined to be situated higher as extending toward the outside W2 of the cabin, while the second grid member 12 is located closer to the outside W2 of the cabin than the first grid member 11 is and extends substantially vertically. Moreover, as shown in FIG. 5, each attachment plate 18 is located substantially at a right angle to the first grid member 11 and is inclined to be situated higher as extending toward the inside W1 of the cabin.

The height dimension of the roof side absorber 10 in the top-bottom direction is set to be small. A lower end portion of the first grid member 11 is located at the back of the corner portion 30C of the roof lining 30. Moreover, the second grid member 12 is located around an end portion of the horizontal wall portion 30S2 of the roof lining 30 on the outside W2 of the cabin.

The roof side absorber 10 also has a function of improving appearance by preventing a gap from being created between A, B, and C pillar trims and the roof lining 30 at the boundary of the A, B, and C pillar trims and the roof lining 30.

Figure 3:
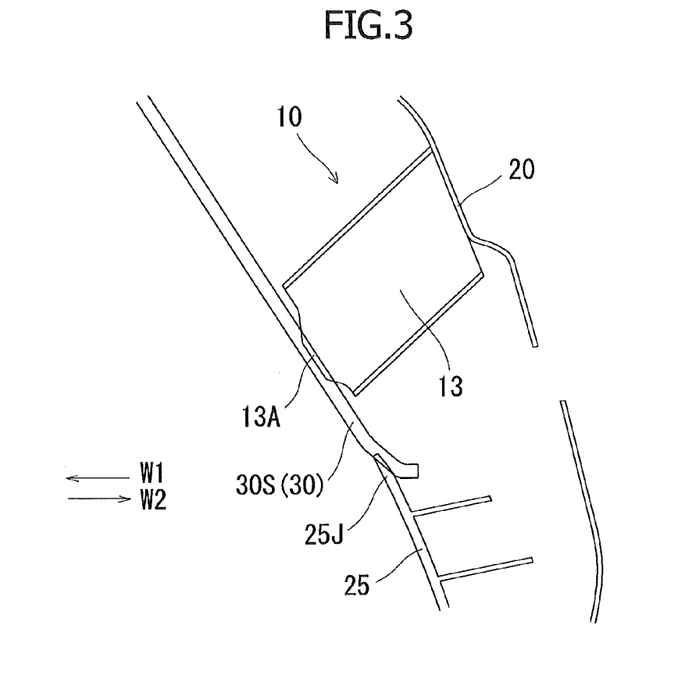
FIG. 3 is a cross-sectional view taken along line C-C in FIG. 1.

Specifically, as shown in FIG. 3, with a side portion 13A of each third grid member 13, the roof side absorber 10 pushes the side portion 30S of the roof lining 30 from the back surface thereof to press it against an upper end portion 25J of a B pillar trim 25. This prevents a gap from being created between the side portion 30S of the roof lining 30 and the upper end portion 25J of the B pillar trim 25. Further, the roof side absorber 10 also has a function of preventing elastic deformation of the roof lining 30 (actions such as the roof lining 30 being pressed and dented inward and elastically returning to the original shape upon release of the pressure) by supporting the roof lining 30 from the back surface thereof.

As shown in FIG. 4, upper contact portions 27 provided at an upper end portion of the roof side absorber 10 are designed to come into contact with the roof side panel 20, and contact pieces 19 as lower contact portions provided at a lower end portion of the roof side absorber 10 are designed to come into contact with the opening trim 40.

The upper contact portions 27 are formed of an upper end portion of the first grid member 11 and upper end portions of the third grid members 13. Moreover, the contact pieces 19 are arranged below the attachment portions 8, respectively, as shown in FIGS. 6A and 6B and project toward the roof side panel 20 from a lower end portion of the second grid member 12 of the roof side absorber 10 as shown in FIGS. 5 and 8.

Each contact piece 19 is formed elongated in the longitudinal direction of the roof side absorber 10, and its length in the vehicle front-rear direction is set greater than that of the attachment plate 18 of the attachment portion 8. Moreover, the end of each contact piece 19 on the vehicle rear side Rr is located closer to the vehicle rear side Rr than is the end of the corresponding attachment plate 18 on the vehicle rear side Rr. The end of the contact piece 19 on the vehicle front side Fr is located closer to the vehicle front side Fr than is the end of the attachment plate 18 on the vehicle front side Fr.

As shown in FIG. 8, multiple triangular support ribs 14 are laid between each contact piece 19 and the second grid member 12. As shown in FIG. 4, a tip portion of the contact piece 19 (end portion in the projecting direction of the contact piece 19) is inclined to be situated higher as extending toward the outside W2 of the cabin, and is designed to come into contact with the outer surface of the sidewall 46 of the opening trim 40 on the inside W1 of the cabin (the other sidewall 46 mentioned earlier). Because the tip portion of the contact piece 19 is inclined to be situated higher as extending toward the outside W2 of the cabin, the tip portion has a preferable angle of contact to the opening trim 40 (the tip portion can be in more secure contact with the opening trim 40).

Figure 6B:
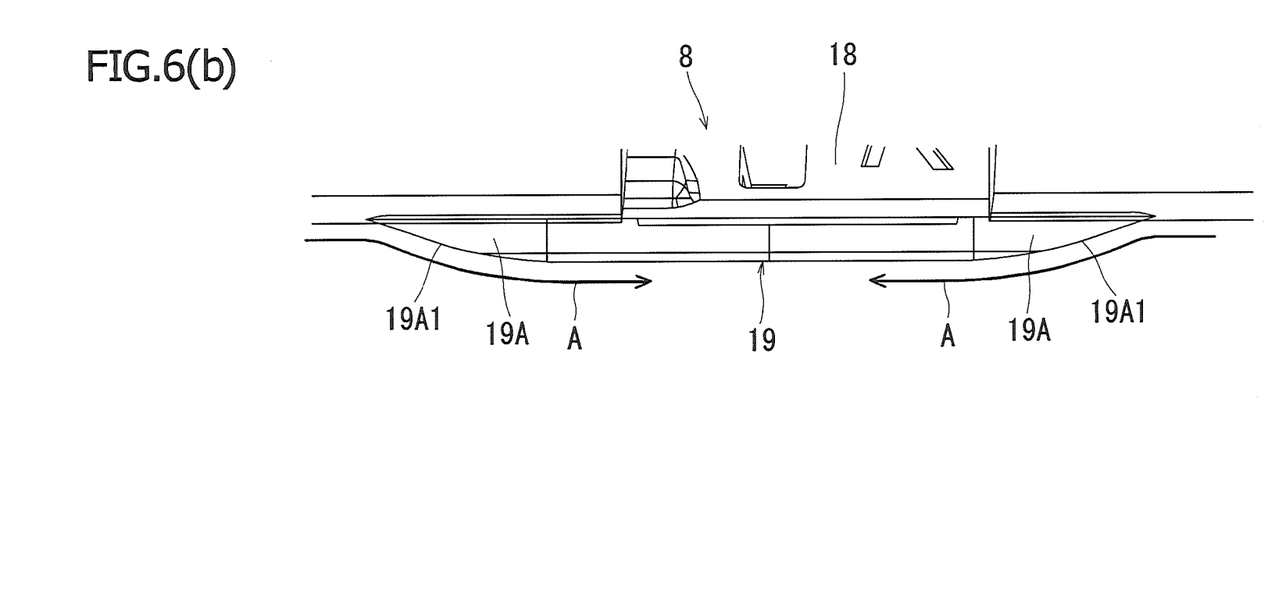
FIG. 6B is an enlarged view of a part Z in FIG. 6A.

Moreover, as shown in FIGS. 6A and 6B, both longitudinal end portions 19A of each contact piece 19 are formed such that the amounts of their projection from the lower end portion of the roof side absorber 10 increase gradually toward the longitudinal center of the contact piece 19. Ends 19A1 of both end portions 19A in their projecting direction are each formed in a gentle convex arc shape. The amount of projection of a longitudinally middle portion of the contact piece 19 located between both end portions 19A is fixed. The contact pieces 19 are not provided to any portions of the roof side absorber other than the portions thereof below the attachment portions 8.

The roof side absorber 10 attempts to rotate about the axis of the roof side absorber 10 in the vehicle front-rear direction due to its own weight or external force. However, with the configuration of the present invention described above, the rotation of the roof side absorber 10 about the axis (referred to as "turn") can be prevented as described below.

Specifically, suppose that the roof side absorber 10 on the right side of the vehicle body attempts to rotate about the axis clockwise or the roof side absorber 10 on the left side of the vehicle body attempts to rotate about the axis counterclockwise as viewed from the rear Rr of the vehicle. In this case, the upper contact portions 27 come into contact with the roof side panel 20 and are thus received by the roof side panel 20. Accordingly, the rotation of the roof side absorber 10 about the axis is prevented.

Suppose also that the roof side absorber 10 on the right side of the vehicle body attempts to rotate about the axis counterclockwise or the roof side absorber 10 on the left side of the vehicle body attempts to rotate about the axis clockwise as viewed from the rear Rr of the vehicle. In this case, the contact pieces 19 come into contact with the opening trim 40 and are thus received by the opening trim 40. Accordingly, the rotation of the roof side absorber 10 about the axis is prevented.

As a result, the roof side absorber 10 can receive impact from the inside W1 of the cabin from the intended direction. Thus, the roof side absorber 10 can effectively absorb impact on an occupant's head.

Figure 9:
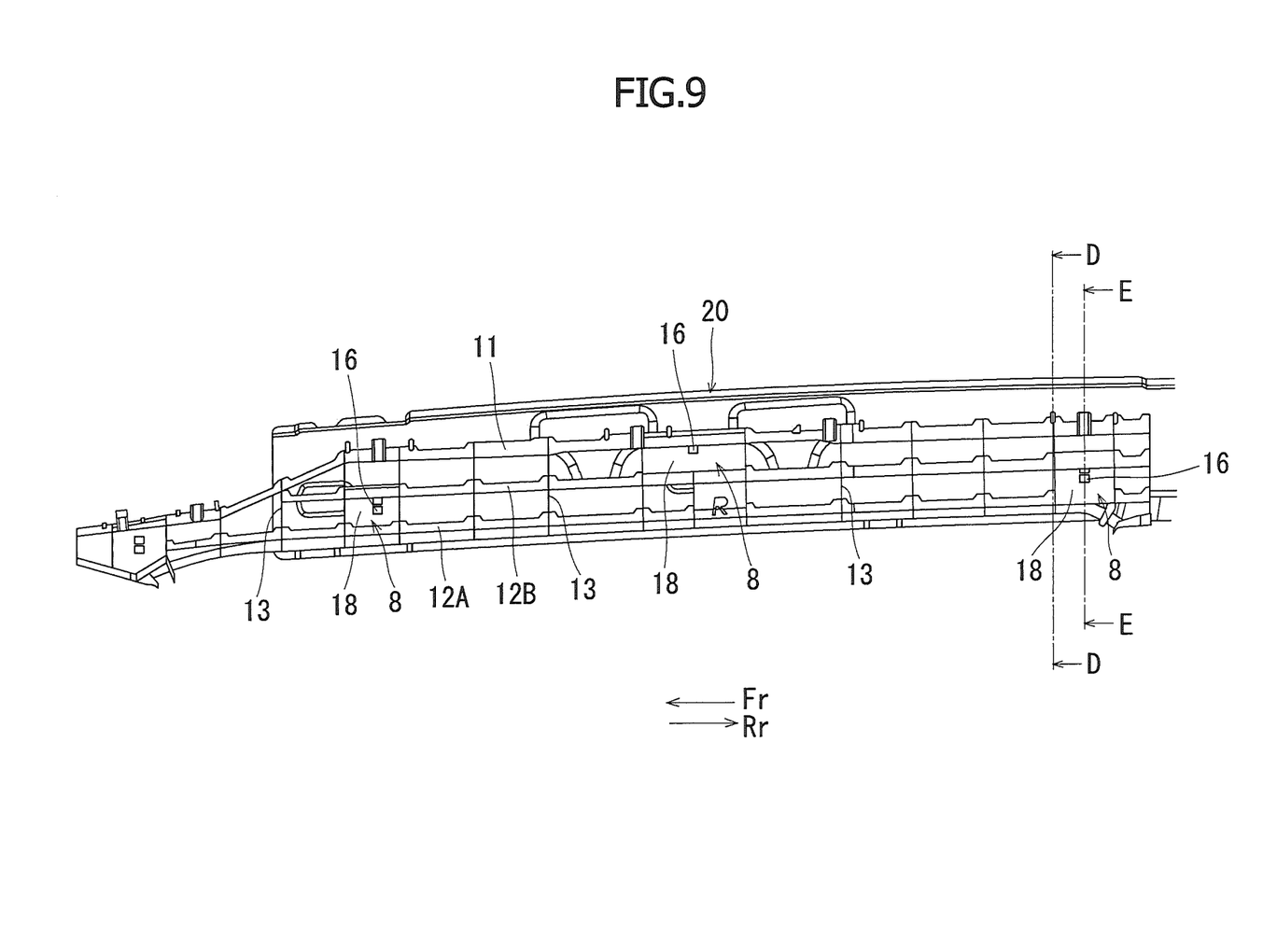
FIG. 9 is a view of a roof side absorber of a comparative example as seen from the inside of the cabin.
Figure 10A:
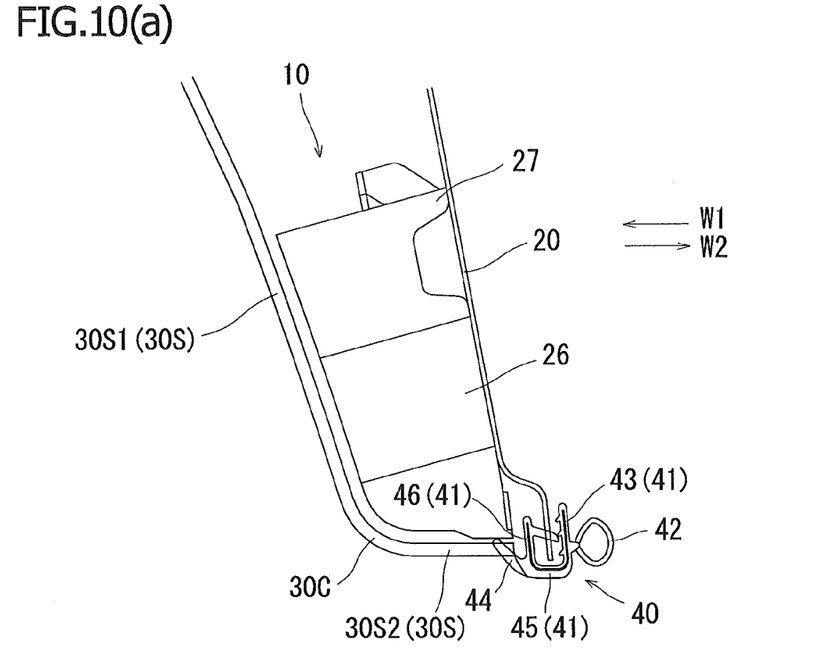
FIG. 10A is a cross-sectional view taken along line D-D in FIG. 9.
Figure 10B:
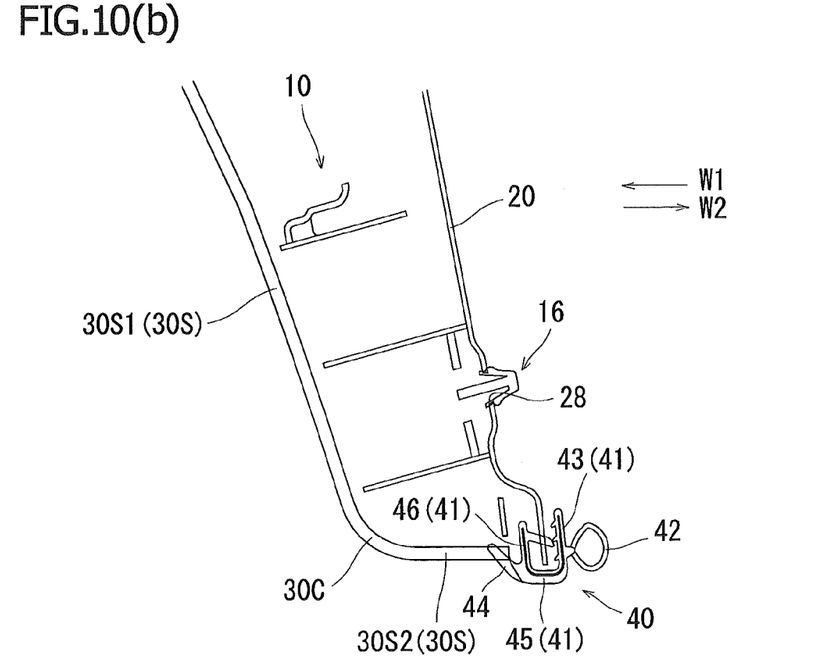
FIG. 10B is a cross-sectional view taken along line E-E in FIG. 9.

For example, as shown in FIGS. 9, 10A, and 10B, in the case of a structure of a comparative example in which the upper contact portions 27 and lower contact portions 26 are both in contact with the roof side panel 20, the upper contact portions 27 and the lower contact portions 26 which are separated away from each other in the top-bottom direction are both arranged above the opening trim 40 (the lower end of the roof side absorber 10 of the present invention is located at the same position as the lower end of the roof side absorber of the comparative example).

For this reason, required is a structure which includes the roof side absorber 10 of the present invention with its upper end portion extended further upward. This increases the dimension of the roof side absorber 10 in the top-bottom direction.

Further, in the structure of the comparative example described above, the attachment portions 8 are staggered in the top-bottom direction (see FIG. 9) so as to securely prevent the rotation of the roof side absorber 10 about the axis. This increases the dimension of the roof side absorber 10 in the top-bottom direction. In FIG. 9, reference numerals 12A and 12B denote second grid members elongated in the vehicle front-rear direction.

In contrast, the configuration of the present invention described above can reduce the dimension of the roof side absorber 10 in the top-bottom direction and thus reduce the size of the roof side absorber. Moreover, the configuration of the present invention can reduce the attachment space for the roof side absorber 10 in the top-bottom direction.

Accordingly, it is possible to improve the design freedom without affecting the design of the vehicle and the layout of other components held therein.

In the case of the configuration in which the contact pieces 19 are in contact with the opening trim 40, the gap between the roof side absorber 10 and the roof side panel 20 to which the attachment base portion 41 of the opening trim 40 is fitted is small. The roof lining 30 and the roof side absorber 10 are attached to a vehicle body panel such as the roof side panel 20, and thereafter the opening trim 40 is attached by fitting onto the end portion of the roof side panel 20. Thus, when the above-mentioned gap is small, the following problem occurs.

Specifically, the roof side panel 20 is formed by welding multiple parts, and this welding lowers the dimensional accuracy of the roof side panel 20. Moreover, the roof side absorber 10 itself has large variations in the gap between itself and the roof side panel 20 in areas apart from the attachment portions 8. For this reason, when the above-mentioned gap is short, positional variations of the roof side panel 20 and positional variations of the roof side absorber 10 may make it difficult to insert the attachment base portion 41 of the opening trim 40 between the roof side absorber 10 and the roof side panel 20. This may lead to a possibility that the mountability of the opening trim 40 could be lowered.

However, in the configuration of the present invention described above, the contact pieces 19 are arranged below the attachment portions 8 where it is easy to secure positional accuracy. Thus, the above-mentioned gap can be easily set to the desired dimension. This can improve the mountability of the opening trim 40. Accordingly, the contact pieces 19 can be set in contact with the opening trim 40 securely.

The contact pieces 19 are not provided to any portions of the roof side absorber other than the portions below the attachment portions 8, meaning that the contact pieces 19 are arranged only below the attachment portions 8 where it is easy to secure positional accuracy. Thus, influence of the low dimensional accuracy of the roof side panel 20 is avoided. Accordingly, the above-mentioned gap can be set to the desired dimension more easily. This makes it possible to further improve the mountability of the opening trim 40.

Both longitudinal end portions 19A of each contact piece 19 are formed such that the amounts of their projection from the lower end portion of the roof side absorber 10 increase gradually toward the longitudinal center of the contact piece 19. Thus, when one inserts the attachment base portion 41 of the opening trim 40 between the roof side absorber 10 and the roof side panel 20, both end portions 19A can guide the attachment base portion 41 of the opening trim 40 into the gap between the roof side absorber 10 and the roof side panel 20. Arrows A in FIG. 6B show the directions of the guide.

As a result, the opening trim 40 can be mounted smoothly to the roof side panel 20 without being caught on the contact pieces 19. This can improve the mountability of the opening trim 40.

That which is claimed:

1. A vehicle roof structure comprising:
   a roof side absorber arranged between a roof side panel and a side portion of a roof lining; and
   an opening trim fitted to an end portion of the roof side panel on an upper side of a door opening,
   wherein an upper contact portion provided at an upper end portion of the roof side absorber is in contact with the roof side panel, and
   a lower contact portion provided at a lower end portion of the roof side absorber is in contact with the opening trim.

2. The vehicle roof structure according to claim 1, wherein an attachment portion provided to the roof side absorber is attached to the roof side panel, and
   the lower contact portion is arranged below the attachment portion.

3. The vehicle roof structure according to claim 2, wherein the lower contact portion is not provided to any portions of the roof side absorber other than the portion below the attachment portion.

4. The vehicle roof structure according to claim 1, wherein the lower contact portion is formed of a contact piece projecting toward the roof side panel from a lower end portion of the roof side absorber,
   the contact piece is formed elongated in a longitudinal direction of the roof side absorber, and both longitudinal end portions of the contact piece are formed such that amounts of projection thereof from the lower end portion of the roof side absorber increase gradually toward a longitudinal center of the contact piece.

5. The vehicle roof structure according to claim 2, wherein the lower contact portion is formed of a contact piece projecting toward the roof side panel from a lower end portion of the roof side absorber, the contact piece is formed elongated in a longitudinal direction of the roof side absorber, and both longitudinal end portions of the contact piece are formed such that amounts of projection thereof from the lower end portion of the roof side absorber increase gradually toward a longitudinal center of the contact piece.

6. The vehicle roof structure according to claim 3, wherein the lower contact portion is formed of a contact piece projecting toward the roof side panel from a lower end portion of the roof side absorber, the contact piece is formed elongated in a longitudinal direction of the roof side absorber, and both longitudinal end portions of the contact piece are formed such that amounts of projection thereof from the lower end portion of the roof side absorber increase gradually toward a longitudinal center of the contact piece.

* * * * *